No. 788,752. PATENTED MAY 2, 1905.
A. L. CHRISTENSON.
LINER FOR CENTRIFUGAL SEPARATORS.
APPLICATION FILED DEC. 29, 1903.
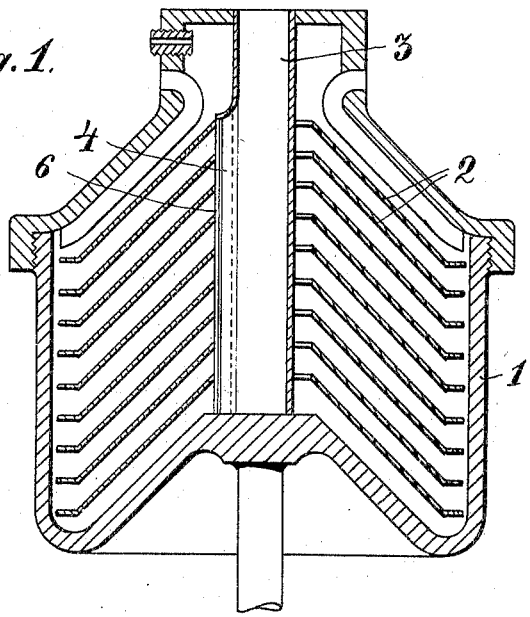
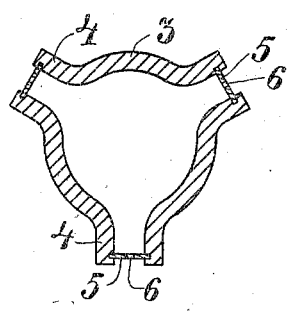
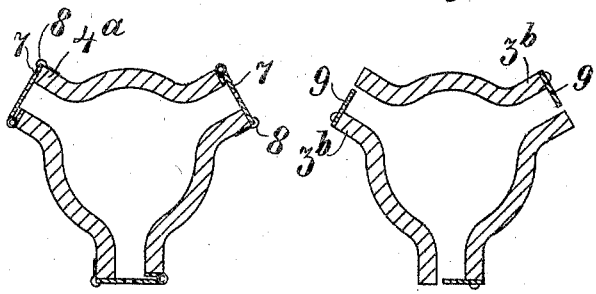
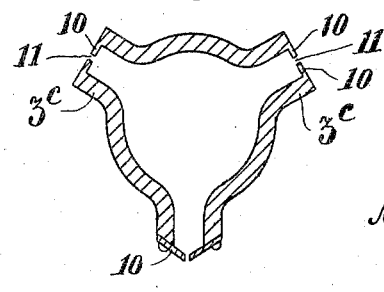

No. 788,752.

Patented May 2, 1905.

UNITED STATES PATENT OFFICE.

ALGOT LEVIN CHRISTENSON, OF STOCKHOLM, SWEDEN.

LINER FOR CENTRIFUGAL SEPARATORS.

SPECIFICATION forming part of Letters Patent No. 788,752, dated May 2, 1905.

Application filed December 29, 1903. Serial No. 186,966.

*To all whom it may concern:*

Be it known that I, ALGOT LEVIN CHRISTENSON, a subject of the King of Sweden and Norway, and a resident of Stockholm, Sweden, have invented new and useful Improvements in Distributing Devices for Liners for Centrifugal Separators, of which the following is a specification, reference being had to the drawings accompanying and forming a part hereof.

This invention relates to improvements in distributing devices for liners for centrifugal separators.

The object of the invention is to provide means for effecting a more uniform distribution of the full-milk over the whole liner than was heretofore possible without decreasing the possibility of cleaning the inlet-pipe.

The invention consists, briefly, in the provision of throttling means at the orifices of the said distributing devices in such a manner that they will effect a throttling of the milk strong enough to compel the milk to rise in the distributing device on account of the centrifugal force, and thereby to flow out more uniformly along the whole length of the distributing device than heretofore.

In carrying out the invention there may be arranged at the outer parts of the distributing device plates, ribs, or the like, which may be pivotally or slidably attached to the said device or fixed to the same in any other suitable manner and which may be provided with small openings in the shape of narrow slots, holes, or the like or be arranged in such manner as to partly cover the orifices of the said device in such manner that the above-mentioned throttling will be effected.

In the accompanying drawings I have shown some embodiments of my invention.

Figure 1 shows a vertical section of centrifugal separator-bowl having an inlet-pipe constructed in accordance with the present invention. Fig. 2 is a horizontal cross-section of the said inlet-pipe. Figs. 3, 4, and 5 show each a constructional form of my improved distributing device likewise in horizontal cross-section.

Referring to Fig. 1, the bowl 1 is provided with a liner which in well-known manner consists of a number of conical plates 2, superposed on one another so as to radially divide the contents of the drum into thin layers in radial direction. For introducing the full-milk into the bowl 1 is likewise in well-known manner used a central inlet-pipe 3, having radially-projecting slotted flanges 4, through which the full-milk is thrown out into the liner during the rotation of the bowl. The said flanges 4 may, as shown in Fig. 2, be provided with grooves in which may be inserted comparatively thin plates 5. The latter may be provided with a longitudinally-running slot 6 of such dimensions that it will be capable of throttling the milk in such manner that the same will be compelled to rise within the inlet-pipe along the whole length of the same, and thus to flow out over the whole liner more uniformly than heretofore.

Referring to Fig. 3, the flanges $4^a$ are provided with pivoted plates 7, which may be held in position by means of small spring-hooks 8 or the like. The plates 7 (shown in the said figure) are attached at the one of their side edges, so that they are turnable horizontally; but obviously they may also be attached to the flanges at their upper or lower ends, so that they will be turnable vertically or in any other manner. The said hooks 8 or the corresponding device used may be dispensed with in the case that the inlet-pipe is used in a bowl, the liner of which consists of conical ring-shaped plates superposed on one another and bearing with their inner edges against the flanges of the inlet-pipe, inasmuch as in such case the said plates 7 will be held in position by means of the said conical plates constituting the liner.

Referring to Fig. 4, plates 9 are attached to the one side wall of each flange $3^b$ of the inlet-pipe, the said plates 9 reaching almost to the other side wall of the flanges in such manner that a narrow slot will be left for letting out the full-milk.

Referring to Fig. 5, the slots of the flanges $3^c$ are at their outer mouths limited by ribs 10, preferably made integral with the inlet-pipe, which ribs 10 between themselves leave a very narrow slot 11. Instead of being made integral with the inlet-pipe the said ribs 10 may also be attached to the said pipe by soldering or by screws or the like, as shown in the lower part of Fig. 5, and be placed obliquely, so as to prevent the collection of slime in the flanges. The last-mentioned device may also be applied to the constructional forms in which only one plate or the like is used for covering the outer mouth of each flange, in which case the said plate may be of angle-shaped or curved cross-section.

Obviously the slots of the flanges of the inlet-pipes described above may be made of such width that the cleaning of the same may be performed without difficulty, and the outlet-openings may be made as small or narrow as desired without reducing the possibility of cleaning the slots of the flanges. It is also obvious that the plates or ribs used may be attached or connected to the flanges of the inlet-pipes in any other manner than those described above. Since, however, the method of attaching the said parts is unessential for the present invention, the constructional forms shown may be considered to be sufficient to illustrate the invention.

Though I have shown in the drawings only inlet-pipes the flanges of which are provided with longitudinally-running slots, the invention may also be applied to inlet-pipes the flanges of which are provided with outlet-openings in the shape of small holes or the like, in which case the plates or the like may be arranged to cover to a certain extent the outer mouths of the said holes, as will be easily understood by those skilled in the art.

In the drawings the invention has been shown as applied to such inlet-pipes as provided with radially-projecting flanges. It is obvious that the invention may be equally well applied to distributing devices of any other kind, as will be well understood by persons skilled in the art to which it appertains.

Having now particularly described my invention and in what manner the same may be performed, what I claim as new, and desire to secure by Letters Patent, is—

1. The combination with a centrifugal separating-bowl, of an orificed distributing device, and throttling means connected to said distributing device and adapted to compel the full-milk to rise along the whole height of the distributing device, substantially as and for the purpose set forth.

2. The combination with a centrifugal separating-bowl of an orificed distributing device, and throttling means inside the orifices of the said device adapted to compel the full-milk to rise along the whole height of the distributing device, substantially as and for the purpose set forth.

In testimony whereof I have signed my name to this specification in the presence of two subscribing witnesses.

ALGOT LEVIN CHRISTENSON.

Witnesses:
OSBORN THORGNY FREDRIK KLING,
ERIK OSCAR LINDBERG.